358-86
SR
XR 3,737,785

United States Patent [19] [11] 3,737,785
Korpel [45] June 5, 1973

[54] SOLID-STATE SIGNAL DISTRIBUTION SYSTEM

[75] Inventor: Adrianus Korpel, Prospect Heights, Ill.

[73] Assignee: Zenith Radio Corporation, Chicago, Ill.

[22] Filed: Mar. 24, 1971

[21] Appl. No.: 127,698

[52] U.S. Cl. ....................325/442, 178/DIG. 18
[51] Int. Cl. ....................H04b 1/26
[58] Field of Search ....................325/442; 178/DIG. 18; 333/30, 72; 324/77; 329/198; 330/5.5; 331/155; 332/26; 307/88.3

[56] References Cited

UNITED STATES PATENTS

| | | | |
|---|---|---|---|
| 3,633,977 | 1/1972 | Slobodnik, Jr. | 325/442 |
| 3,626,309 | 12/1971 | Knowles | 329/198 |
| 3,545,841 | 12/1970 | Dentino et al. | 178/DIG. 18 |
| 3,334,307 | 8/1967 | Blum | 333/72 |
| 3,582,838 | 6/1971 | De Vries | 330/5.5 |

*Primary Examiner*—Robert L. Griffin
*Assistant Examiner*—Barry L. Leibowitz
*Attorney*—John J. Pederson and John H. Coult

[57] ABSTRACT

An acoustic surface-wave device is utilized to distribute coded samples of an information signal among a plurality of output ports. A first surface-wave transducer responds to signals from a source of time-domain information for launching acoustic surface waves in a piezoelectric substrate. The piezoelectric material is one which exhibits a non-linear relationship between an applied electric field and the strain developed by that field; alternatively, non-linear elements are included in the output circuitry. Either by reason of the dispersive nature of the transducer or by treatment of the time-domain signals before their application to the transducer, the surface waves propagate in one direction and exhibit a given mode of spatial dispersion along that path of propagation. A second surface-wave transducer responds to counterpart signals from another source to launch acoustic surface waves in the opposing direction which exhibit a mode of spatial dispersion that effectively is the conjugate of the aforesaid given mode. Finally, a plurality of output transducers are spaced successively along the propagation paths. The output transducers are individually responsive to respective different spatially-distributed combinations of the dispersion modes that all have the same frequency but which yield respective different output signals individually corresponding to respective different time-displaced portions of the information signal.

9 Claims, 10 Drawing Figures

Inventor
Adrianus Korpel
By Francis W. Crotty
Attorney

Inventor
Adrianus Korpel
By Francis W. Crotty
Attorney

Inventor
Adrianus Korpel
By Francis W. Crotty
Attorney

SOLID-STATE SIGNAL DISTRIBUTION SYSTEM

BACKGROUND OF THE INVENTION

The present invention pertains to frequency-domain signal distribution systems. More particularly, it pertains to a solid-state system in which frequency-coded signals are distributed among different output ports in correlation with the frequency coding characteristics.

Present-day television receivers conventionally utilize as a display system a cathode-ray tube in which an electron beam is caused to scan horizontally and vertically over a phosphor to define an image raster, while the beam intensity is modulated in amplitude by a video signal to control image brightness. Consequently, an individual picture element in the display islocated by the amplituide and timing of the scanning signals, while the brightness of that picture element is determined bythe instantaneous amplitude of the video signal when the electron beam is located at the position of the picture element. That is, the entire information which defines the picture element is delivered simultaneously, and the energy which grooves the brightness of the picture element must be delivered to the picture element in the very short time interval during which the electron beam is in position on the picture element.

Numerous other devices, such as panels of electroluminescent cells, have been proposed to produce image displays. In general, with respect to various ones of such display systems, the incoming information is also of a time-sequential character and the manner of addressing the display device correspondingly is of a time-sequential or time-domain mode. Consequently, the entire energy for developing a picture element at any particular time-determined position must be delivered during the time interval corresponding to that position. This places a heavy burden both upon the necessary characteristics of the display device and upon the requirements of the addressing apparatus. My prior United States Letters Pat. No. 3,488,437, issued Jan. 6, 1970, and assigned to the assignee of the present application, discloses a different display system that overcomes the aforenoted limitations of prior systems. That system utilizes a display device which is addressed, as to picture element position, in terms of frequency of the addressing signals that also carry the brightness information. This contrasts with the conventional time-domain approach described above, in which the position is governed by correlated but separate scanning signals. One leading advantage of the display device of my prior patent is that the energy utilized to develop the brightness of a given picture element may be delivered over a comparatively long period of time, instead of just during the short interval when the element is scanned as in the time-sequential system. This is accomplished by simultaneously projecting a plurality of beams of light angularly spaced to define a line of image elements with the position of each beam depending upon the frequency of a corresponding control signal and the intensity of each beam defining the brightness of the image element it creates on an image screen. Thus, each element may be energized for the entire period during which, in a time-sequential system, the same number of image elements would be sequentially energized.

In order to supply the necessary frequency-domain signal for driving the display device specifically disclosed in my prior patent, as well as to drive other kinds of display devices in which the addressing is controlled by the frequency of the driving signals, that prior patent further discloses an apparatus in which a display-information signal of a time-sequential character is converted to a signal of frequency-domain character. This, of course, renders the display system compatible with conventional television standards that utilize a time-sequential mode of picture transmission. Further analysis and an expanded discussion of the use of frequency-domain coding of intelligence-bearing signals will be found in an article entitled "The Interchange of Time and Frequency in Television Displays" by Korpel, et al, which appeared in the Proceedings of the I.E.E.E., Volume 57, No. 2, Feb., 1969, at pp. 160–170.

In recent years, there has also been considerable activity involving the use of acoustic surface waves for transmitting signal information. Typically, input and output transducers spaced apart on a piezoelectric substrate are each in the form of interleaved combs of conductive electrodes. One transducer responds to input signals for launching acoustic waves that, subsequently, interact with the other transducer to produce output signals. The device exhibits signal selectively as a result of which it has come to be known as a surface wave integratable filter or SWIF. A more detailed explanation and the disclosure of numerous alternatives and modifications will be found in U.S. Pat. No. 3,582,838, issued June 1, 1971, in the name of Adrian J. DeVries and also assigned to the assignee of the present application.

OBJECT OF THE INVENTION

It is a general object of the present invention to provide a new and improved signal distribution system in which certain characteristics of an acoustic surface wave transmission device are utilized advantageously in the handling and distribution of frequency-domain information signals.

A more particular object of the present invention is to provide a new and improved system in which frequency-coded information signals are distributed among a plurality of different output ports in accordance with the coding of their frequencies.

Another particular objective of the present invention is to provide a new and improved signal distribution system in which time-coded information signals are converted to signals of a frequency-domain character and distributed in accordance with that frequency coding.

SUMMARY OF THE INVENTION

A signal distribution system constructed in accordance with the present invention includes a substrate of piezoelectric material and a source of time-domain intelligence-bearing signals. A first input transducer, coupled to the source and responsive to its signals, launches acoustic surface waves in the substrate. Those waves propagate in a predetermined direction and exhibit a given mode of spatial dispersion along the path of propagation. A second input transducer responds to counterpart signals for launching in the substrate acoustic surface waves that propagate in the opposite direction. The second surface wave signals exhibit a mode of spatial dispersion, along the path of the propagation, that is effectively the conjugate of the given mode of the first surface wave signals. Finally, a plurality of output transducers are spaced successively along the propagation paths and individually respond to respective different spatially-distributed combinations of the dispersion modes for yielding respective different time-displaced portions of the intelligence-bearing signals.

BRIEF DESCRIPTION OF THE DRAWINGS

The features of this invention believed to be novel are set forth with particularity in the appended claims. The invention, together with further objects and advantages thereof, may best be understood, however, by reference to the following description taken in conjunction with the accompanying drawings, in the several figures of which like reference numerals identify like elements, and in which:

DESCRIPTION OF PREFERRED EMBODIMENTS

Figure 1:
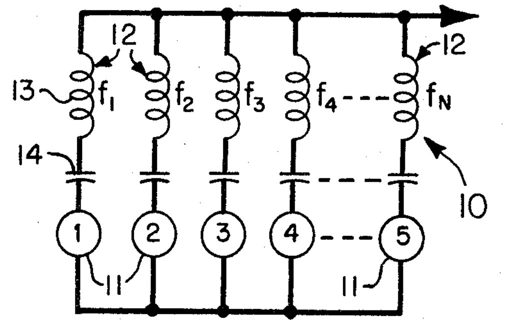
FIG. 1 is a schematic diagram of a one-dimensional frequency domain display.

Much of the description herein in connection with FIGS. 1–5 will be found, together with background material and some additional details and alternatives, in the aforementioned article. This material is in part repeated for the sake of completeness in expressing fundamental characteristics of frequency domain systems, to enable a clearer comprehension of that which then will follow. FIG. 1 illustrates a one-dimensional frequency-domain display panel 10, which is composed of a plurality of light-emitting elements 11 distributed in a line or row so as to represent a total of N such elements. Elements 11 are individually activated by a corresponding plurality of respective different radio-frequency currents of respective frequencies $f_1$, $f_2$ . . . $f_N$ which are distributed through a like plurality of respective different series-resonant filters 12, each of which is composed of the series combination of an inductor 13 and a capacitor 14. Thus, the different resonant filters 12 determine the respective different locations of the display panel that respond to each activating current.

Figure 2:
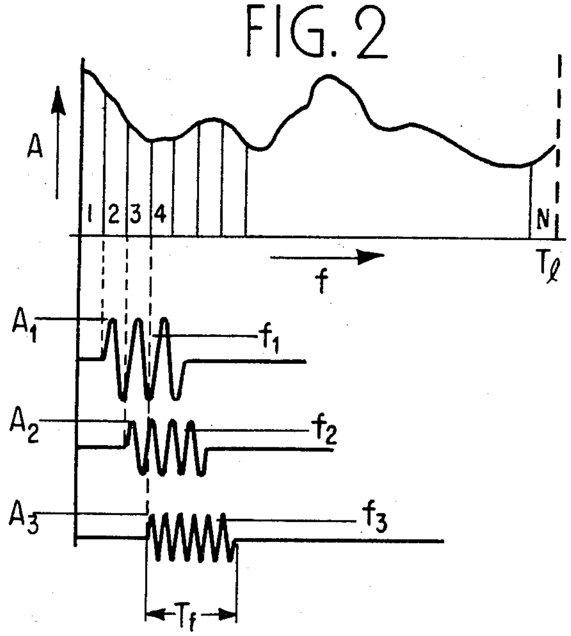
FIG. 2 is a plot illustrative of frequency-domain video signal encoding.

In this instance, display panel 10 is utilized to display one horizontal line of a television picture. The coding of the video signal is illustrated in FIG. 2. A horizontal line of duration $T_l$ is divided into N samples of duration $T_l/N$ having respective amplitudes $A_1$, $A_2$, . . . $A_N$. According to the well-known sampling theorem, the necessary number of samples N is determined by the relationship:

$$N = 2BT_l, \quad (1)$$

where B is the video bandwidth. At the start of each sample (assume the *j*th), a pulse is generated of fixed duration $T_f$, frequency $f_j$ and amplitude proportional to $A_j$. The entire coded signal is then fed into display panel 10 of FIG. 1. In order for the display to operate satisfactorily, it is necessary to avoid overlap, i.e., the frequency difference $\delta f$ between successive rectangular pulses must be larger than the inherent frequency spread:

$$\delta f \geqslant 1 / T_f. \quad (2)$$

The total minimum frequency range required to operate the display is then given by:

$$\Delta f = N\delta f = N / T_f. \quad (3)$$

Substituting for N the relation of equation (1), it is found that:

$$\Delta f = 2B\ (T_l/T_f) \quad (4)$$

Equation (4) specifies the device bandwidth required to operate a frequency-domain display (displaying in one line) for the system characterized by FIG. 2. It may be noted that, in the case of $T_f$ being equal to $T_l$, the bandwidth $2B$ required is equal to that needed for time-sequential operation under similar circumstances, i.e., on a double-sideband basis.

Figure 3:
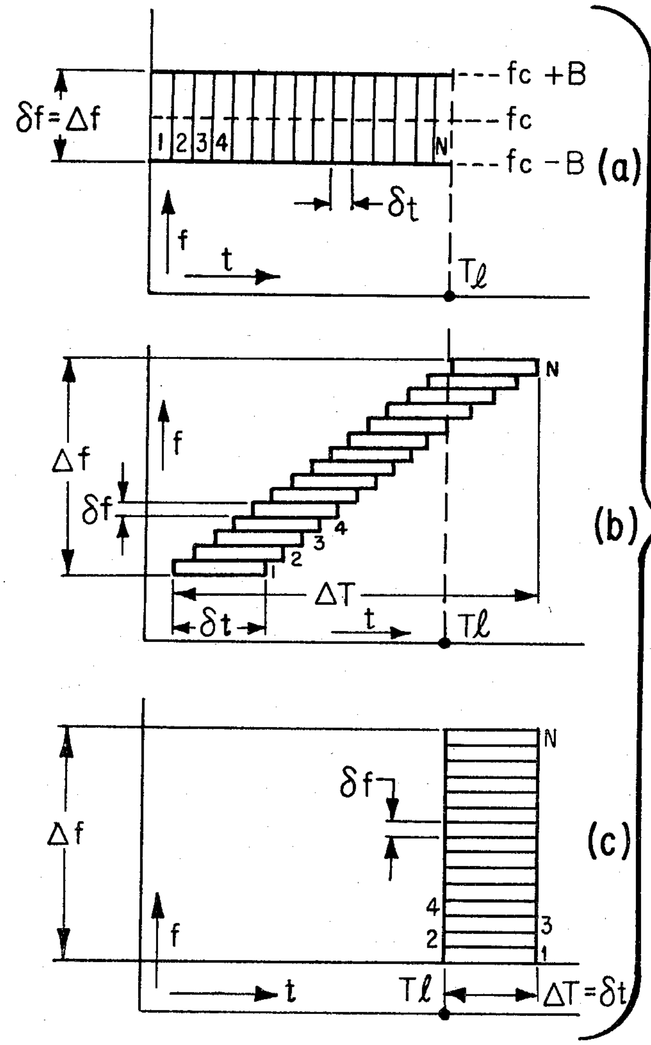
FIGS. 3*a*, 3*b* and 3*c* are time-frequency diagrams of video signals encoded in respective different modes.

The approach represented in FIG. 2 may be compared with the conventional time-sequential approach on the basis of time-frequency diagrams. Thus, FIG. 3(*a*) is the time-frequency diagram for a conventional time-sequential video signal which, for the sake of simplicity, is assumed herein to be double-sideband modulated on a carrier frequency $f_c$. For this case, the elementary samples are time samples of duration $\delta t = 1/2B$ and a frequency content $\delta f = 2B$, the sample area being $\delta f \delta t = 1$. On the other hand, FIG. 3(*b*) shows the time-frequency diagram for the same signal coded according to the approach of FIG. 2. The samples are now of a mixed frequency-time nature with $\delta t = T_f$ and $\delta f = 1/T_f$. The area of each sample is the same as before, i.e., $\delta t \delta f = 1$. The maximum frequency span covered by the coded sample is termed the required device bandwidth $\Delta f$. In FIG. 3(*b*), it is found that $\Delta f = N\delta f = N/T_f$, satisfying the relationship of equation (3). Similarly, the maximum time span covered by the coded samples is termed the device occupation time $\Delta T$. From FIG. 3(*b*), it is seen that in this case:

$$\Delta T \cong (T_l \pm T_f) \quad (5)$$

It follows from the relationship of equation (5) that the required device occupation area (i.e., $\Delta f \Delta T$) exceeds the information area (i.e., $N\delta f \delta t = N$) by a factor $\cong 1 + T_l / T_f$. This factor expresses a mismatch that exists between the coding (as regards the sample location in the time-frequency diagram) and the display device.

The aforesaid prior article and patent disclose approaches which at least in part overcome the existence of the just-mentioned mismatch. It will be noted that, in displaying the coded signal by a panel such as that in FIG. 1, no use is made of the relative time of the occurrence of the samples. Consequently, the coding scheme advantageously is modified so that all pulses emerge simultaneously at the end of a line. A time-frequency diagram for this arrangement is shown in FIG. 3(*c*), where it is seen that, although the required device bandwidth $\Delta f$ is still unchanged, the device occupation time is reduced to $\Delta T = T_f$ so to make the device occupation area equal to N. From the point of view of occupation area, the coding in the FIG. 3(*c*) system is now matched to the device in the sense that the device is provided with the maximum rate of information it can handle (e.g., with display panel 10 of FIG. 1, all units are "on" during the entire device occupation time). Further, it still is possible to trade device bandwidth for device occupation time; as yet, the quantity $T_f$ is completely unspecified.

As thus far considered, only one line of video information is displayed. In practice, of course, it is usually desired to display a complete frame of a television or like picture consisting of $M$ lines. Usually a similar approach, the same considerations apply as discussed above, with the replacement of the line duration $T_l$ by the frame duration $MT_l$. If, however, the value of $T_f$ is to be held within practical limits, the required device bandwidth $\Delta f$ may become impractically large. Consequently, an appropriate compromise is to utilize frequency-domain coding for the processing of each line of information while the lines themselves are displayed sequentially. To prevent overlapping of lines, it is required that the device occupation time per line $\Delta T$ be smaller than the line duration $T_l$. For the coding system of FIG. 3(*c*) this is achieved by satisfying the relationship $T_f \leqslant T_l$. In the case of FIG. 3(*b*), however, the device occupation time is always longer than the line. This is compensated by taking advantage of the fact that part of each video line (blanking interval $T_b$) does not carry video information. Accordingly, the approach of FIG. 3(*b*) is accomplished by satisfying the relationship:

$$(T_l - T_b) + T_f \leqslant T_l \text{ or } T_f \leqslant T_b. \quad (6)$$

Various different system approaches may be utilized, at least in theory, for the purpose of frequency coding a video signal for use by a display device arranged like that of FIG. 1. One direct method is to modulate tthe video signal onto a carrier which itself is varying linearly in frequency, as by an amount $\Delta f$ in the time $T_l$. This corresponds closely with the approach depicted by the time diagram of FIG. 3(*b*), with $T_f$ being equal to the original sampling time 1/2B of FIG. 3(*a*). From equation (4) it may be observed that:

$$\Delta f = 4\ B^2\ T_l\ . \quad (7)$$

It may be shown, by substituting standard television parameters for bandwidth and line trace intervals, that this most direct method is impractical except in the case where only a comparatively low-grade resolution is required. In order, then, to arrive at a manageable device bandwidth while yet obtaining adequate resolution, the information samples are appropriately stretched in time. To this end, use preferably is made of a dispersive delay line through which all of the samples are transmitted.

A dispersive delay line is basically a network having a group delay $\tau$ which, over a certain band, varies linearly with frequencies so that:

$$\tau = \omega\ T_d^2 + T_o\ , \quad (8)$$

where $T_d$ is the coefficient of dispersive delay time and $T_o$ is a constant delay time. The group delay is customarily defined as the negative frequency derivative of the phase response (i.e., $\tau = -d\phi/d\omega$). Hence, the transfer function of the delay line may be written:

$$\exp\ (j\phi) = \exp j\ (-(1/2)\ \omega^2 T_d^2 - \omega\ T_o + \phi_o). \quad (9)$$

In order to illustrate the pulse stretching properties of such a dispersive line, it is assumed to be excited with a short sampling pulse of duration 1/2B modulated on a carrier $\omega_1$ and occurring at time $t_j$, of the form:

$$E_{\text{in}} = E_j \frac{\sin\ [\pi(t-t_j)2B]}{[\pi(t-t_j)2B]} \cos \omega t \quad (10)$$

Figure 4:
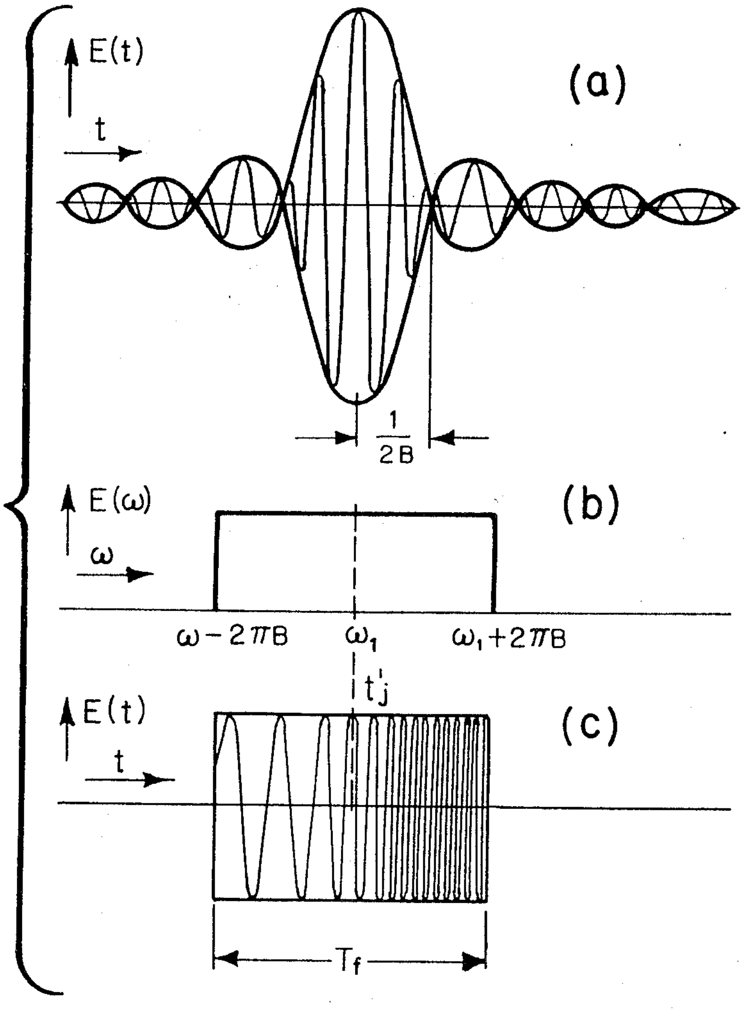
FIGS. 4*a*, 4*b* and 4*c* are diagrams of a sampling pulse which illustrate operation of a mode conversion technique described in connection with FIGS. 6 and 7.

As shown in FIG. 4(*a*), the envelope of this signal $E_{in}$ is that of a so-called standard sampling pulse for a signal of bandwidth B. Such a pulse, when modulated on a carrier $\omega_1$, has a rectangular frequency spectrum extending from $\omega_1 - 2\pi B$ to $\omega_1 + 2\pi B$ as shown in FIG. 4(*b*). The output pulse from the dispersive line has the same frequency content, but, because of the dispersion, the various frequency components appear in succession at times determined by the relationship of equation (8). Thus, the instantaneous frequency of the outgoing pulse, depicted in FIG. 4(*c*), varies from $\omega_1 - 2\pi B$ to $\omega_1 + 2\pi B$ and in a time interval:

$$T_f = 4\ \pi\ B\ T_d^2\ . \quad (11)$$

The center of the pulse appears at a time $t_j'$ which is determined by the delay experienced at the center frequency $\omega_1$, as follows:

$$t_j = t_j + T_o + \omega_1\ T_d^2\ . \quad (12)$$

From equation (10) it can be shown that, for a short input pulse, the sample emerging from the delay line may be written:

$$E_{out} \cong E_2 \cos\ [\omega_1\ (t - t_j') + (1/2\ T_d^2)\ (t - t_j')^2 + \quad ] \quad (13)$$

for the condition $|t - t'_j| < T_f/2$. $E_{out} = 0$ for $|t - t_j'| > T_f/2$. $\psi = (\omega_1 2\ /\ 2\ T_d^2)$ and $E_2$ is proportional to $E_j$. Strictly speaking, equation (13) holds only for short pulses as contemplated by equation (10), i.e., $½B << T_f$.

Figure 5:
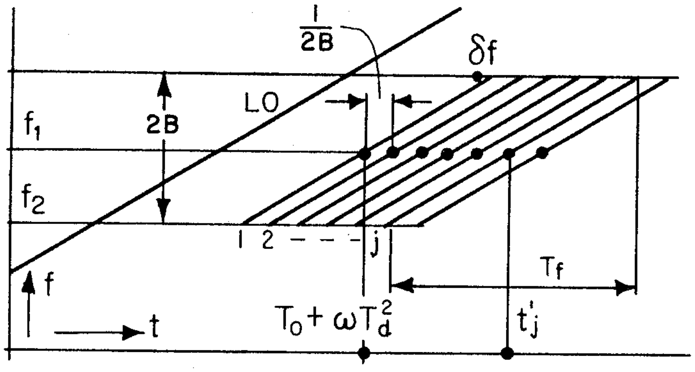
FIG. 5 is a time-frequency diagram useful in connection with the explanation of FIGS. 4 and 6.
Figure 6:
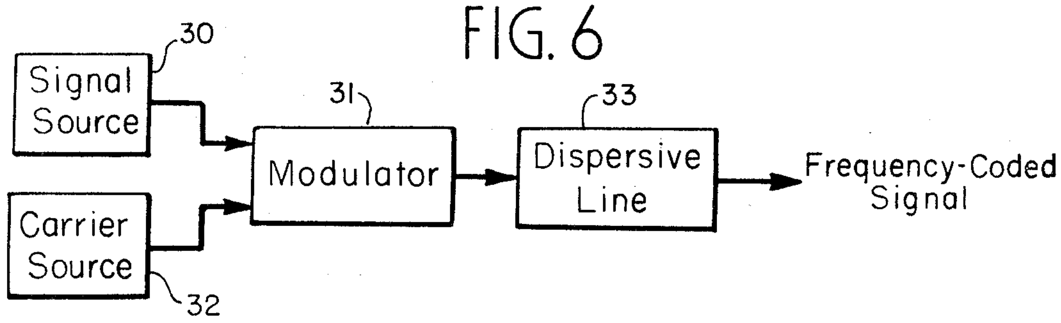
FIG. 6 is a block diagram of a portion of a distribution system.

FIG. 6 illustrates a dispersive delay line system which may be of the kind presently under discussion. That is, a time domain video signal from a source 30 is fed to a modulator 31 which also receives a carrier signal from a source 32. The entire video signal, modulated on the carrier from source 32, is fed to a dispersive delay line 33 from the output of which the ultimate frequency-coded signal is derived. The time-frequency diagram of the signal obtained from dispersive line 33 is illustrated in FIG. 5 where it will be observed that successive samples at times $t_j$ will emerge from line 33 at successive times $t_j'$. Each sample has been stretched out to a time duration $T_f$ and is modulated on a carrier of which the frequency increases linearly with time.

The time-frequency diagram of FIG. 5 was originally presented in the aforesaid article with respect to a display system in which it was desired that each of the outgoing samples had its own constant-frequency carrier. To that end, the output signals from the dispersive line were mixed with a local oscillator whose frequency varied linearly with time at the same rate as the outgoing samples. Such a local oscillator signal is represented in FIG. 5 by the straight line labeled LO. After such mixing with the local oscillator signal, the lower sideband of the resulting signal was in the desired form of rectangular constant-frequency samples of duration $T_f$. The frequency offset between successive pulses was $2\pi\delta f = [1/2B]/T_d^2$, so as to permit the display device, such as panel 10 of FIG. 1, to be able to discriminate between neighboring frequencies. The result was an overall display system which implemented the coding approach of FIG. 3(*b*). The discussion in the aforesaid article continues by disclosing modifications necessary to implement the approach of FIG. 3(*c*) as well as to develop still more general relationships applicable to a variety of dispersive delay line coding arrangements. For purposes of continued discussion herein, however, the time-frequency diagram of the information signals to be processed is that of FIG. 5 and the local oscillator signal depicted in that diagram is not utilized.

Figures 7, 7A:
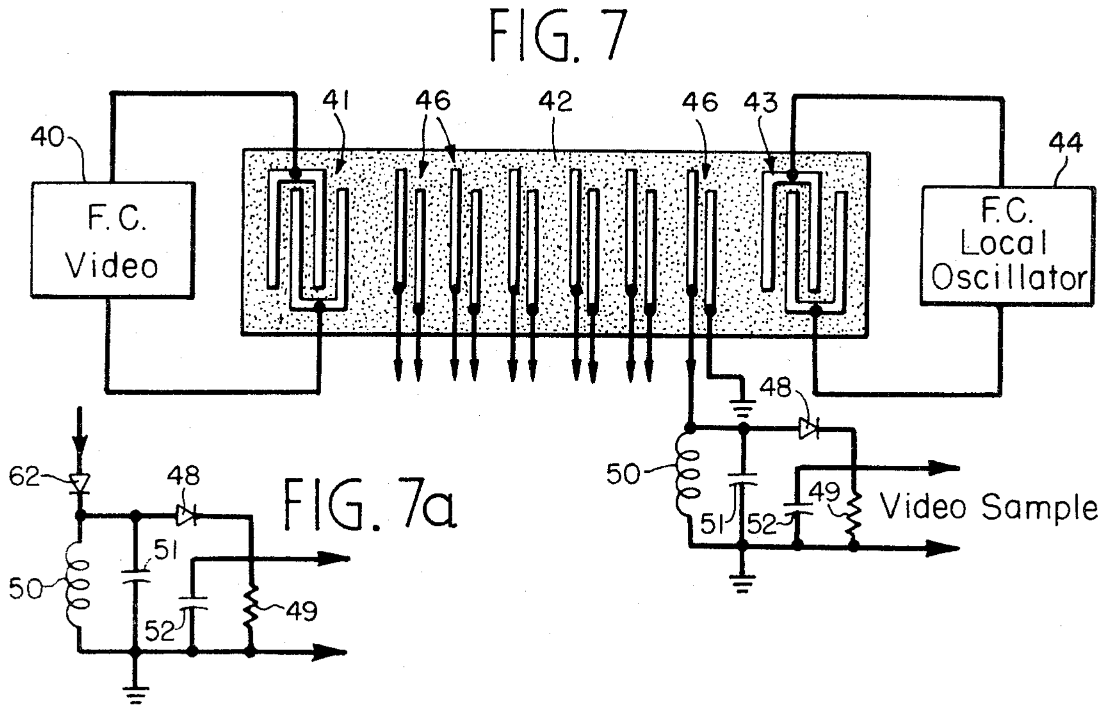
FIG. 7 is a diagram of a signal distribution system which may include the apparatus of FIG. 6.
FIG. 7*a* is a schematic diagram of an alternative to a portion of FIG. 7.

In FIG. 7, then, a frequency coded video source 40 supplies frequency-coded signals that bear intelligence such as picture information. The frequency-coding is of the mode illustrated in FIG. 5. While such signals may be developed by other and different apparatus, for present purposes it is contemplated that they are obtained from the output of dispersive line 33 in the system of FIG. 6. Thus, source 30 produces the time-domain mode video signal as represented by the top trace in FIG. 2, while source 32 produces the carrier frequency $\omega_1$. Again, the resulting signal at the output of dispersive line 33 is of the form expressed by equation (13).

Source 40 is connected to an input transducer 41 mechanically coupled to one major surface of a body of piezoelectric material or substrate 42 which serves as an acoustic-surface-wave propagating medium. Spaced from transducer 41 at the opposite end of substrate 42 on the same surface is a second input transducer 43 across which is connected a source 44 of a frequency-coded local oscillator signal the characteristics of which will be further described below. Spaced successively along the same surface of substrate 42, between input transducers 41 and 43, are a plurality of output transducers 46.

Input transducers 41 and 43 are in this case identical and are each constructed of two comb-type electrode arrays. The conductive teeth of one comb are interleaved with the teeth of the other. The combs are of a material, such as gold or aluminum, which is vacuum deposited on a smoothly-lapped and polished planar surface of the piezoelectric body. The piezoelectric material is one, such as PZT, quartz or lithium niobate, that propagates acoustic surface waves. The distance between the centers of two consecutive teeth of each input array is one-half of the acoustic wavelength in the piezoelectric material of the signal for which it is desired to achieve maximum response; in this case, that corresponds to carrier frequency $\omega_1$. Moreover, the bandwidth of both of transducers 41 and 43 is such as to transmit the instantaneous frequency over the range $\omega_1 - 2\pi B$ to $\omega_1 + 2\pi B$ so as adequately to handle the sampling pulse bandwidth 2B as indicated in the diagram of FIG. 5. Generally speaking, the bandwidth presented by transducers 41 and 43 decreases as the number of teeth in each comb is increased. Other modifications and variations that may be employed in connection with the actual design of the transducers will be found in the aforementioned DeVries application; since such design is now well known, and not of the essence of the present invention, further discussion herein becomes unnecessary.

Output transducers 46 are, for the purpose of illustration, each constructed of just two electrode teeth, and they are formed in the same manner as described above for the combs of transducers 41 and 43. Similarly, the distance between the two teeth in each output transducer 46 is one-half of the acoustic wavelength in the piezoelectric material of the signal wave for which the transducers are to exhibit maximum response. In this case, that frequency of maximum response for the output transducers is selected to be the carrier frequency $\omega_1$.

Direct piezoelectric surface-wave transduction is accomplished by the spatially periodic interdigital electrodes or teeth of transducers 41 and 43. A periodic electric field is produced as a signal from source 40 or 44, respectively, is fed to the teeth and, through piezoelectric coupling, the electric signal from the source is transduced to a traveling acoustic wave on substrate 42. This occurs when the stress components produced by the electric field in the substrate are substantially matched to the stress components associated with the surface-wave mode. The surface-waves launched by transducer 41 that are of interest are transmitted to the right along substrate 42 under output transducers 46. Conversely, surface waves launched by the second input transducer 43 are caused to propagate to the left in FIG. 7 so as also to travel under output transtucers 46. Surface waves transmitted in the other direction from each input transducer are absorbed or scattered as discussed in more detail in the aforesaid DeVries application. In a manner to be explained in more detail, surface-wave energy resulting from a combination of the two different groups of surface waves launched respectively by transducers 41 and 43 is derived by different ones of output transducers 46 in which the energy is converted in each output transducer to an electrical signal. In each case, that electrical output signal is detected or demodulated by a diode rectifier 48 connected in series with a load resistor 49 across an inductor 50 paralleled by a capacitor 51. Inductor 50 is coupled across its associated pair of output transducer teeth 46, and capacitor 51 tunes the inductor to resonance at a frequency $f_r$ selected from within the range of frequencies present in the signals from source 40. A capacitor 52 shunts resistor 49 to by-pass signal energy above the video range. A resulting video sample is developed across load resistor 49 from which point it may be extracted for supply to external apparatus. A similar output load network, composed essentially of a diode and a load resistor together with a tuned circuit, is coupled individually to each of the respective different other output transducers 46, but these additional output load networks have not been shown in FIG. 7 in order to avoid cluttering the drawing unnecessarily.

In operation, the electrical signal from dispersive line 33, represented by equation (13), is responded to by transducer 41 as a result of which that signal appears as surface waves propagating to the right in FIG. 7 in the surface of substrate 42 at a wave velocity V. Letting the distance travelled by those waves to the right be represented as a positive value x taken for simplicity with the reference point $x=0$ in the center of the substrate, assuming the time $t_j'$ of sample emergence to be zero, and at the same time setting the value of $\psi$ also equal to zero, the piezoelectric strain produced by a signal sample in the material of substrate 42 is given by the relationship:

$$S_j \cos [\omega_1 (t - x/v) + 1/2T_d^2 (t - x/v)^2] . \tag{14}$$

The complete strain in the substrate is the sum of all such samples emerging at the various times $t_j$ over the spectrum from $-t_f/2$ to $+T_f/2$. At the same time, local oscillator source 44 is chosen to produce a signal of the form:

$$E_l \cos [\omega_1 t + 1/2T_d^2 t^2], \tag{15}$$

where $E_l$ is at least of the same order of magnitude as $E_j$. Input transducer 43 responds to this latter signal by launching acoustic surface waves to the left, and the piezoelectric strain produced within the material of substrate 42 by those "local oscillator" waves is expressed by a relationship of the form:

$$S_l \cos [\omega_1 (t+x/v) + 1/2T_d^2 (t+x/v)^2] . \tag{16}$$

In both equations (14) and (16), constant phase terms, that indicate the exact phase of video sample and local oscillator at the zero reference points, are left out. By comparing equations (13) and (15), it is observed that the local oscillator signal is basically the counterpart of the frequency-dispersed signal from source 40 in that the local oscillator signal includes the same nondispersive terms. Upon suitable mixing between the two signals, only the non-dispersive terms remain. This is analogous to the more conventional mixing of a local oscillator carrier with a modulated carrier in order to derive only the modulation products. That is, the mode of dispersion of the local oscillator waves from transducer 43 is effectively the conjugate of the mode of dispersion of the waves launched by transducer 41. The term "conjugate" is used here in the sense that, at any point on substrate 42, the difference frequency is constant with time.

Figure 8:
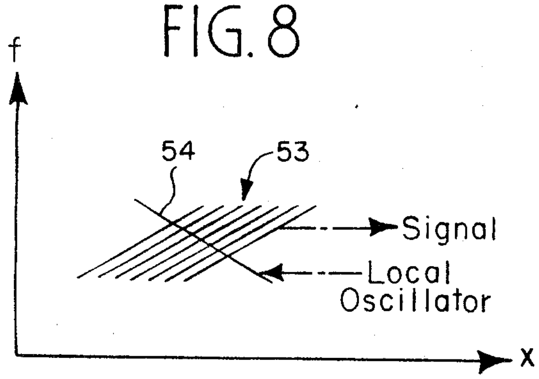
FIG. 8 is a spatial-frequency diagram useful in connection with the explanation of the operation of the system of FIG. 7.

The relative spatial dispersion of the oppositely directed surface waves launched by transducers 41 and 43 may be more completely understood by considering the response to a single pulse of rectangular waveform. The acoustic wave output of transducer 41 will be a sawtooth of a given slope while the output of transducer 43 will have essentially the same waveform but of opposite slope and preferably of greater amplitude. As these oppositely directed surface waves pass one another, at any fixed position along the wave propagation path they have a fixed instantaneous frequency difference which may be zero. That is to say, at one particular space position these waves exhibit identical frequencies whereas at locations on opposite sides of that particular position along the propagation path the waves have different but invariable frequency differences. As shown in FIG. 8, the frequency-dispersed or coded signals from source 40 result in the existence at any instant of a spatially dispersed plurality of strain components 53 across which occur another strain component 54 produced by the local oscillator signal from source 44. Thus, FIG. 8 may be viewed as a spatial-frequency vs. position diagram analogous to the temporal-frequency vs. time diagram of FIG. 5.

Within the material of substrate 42, the piezoelectric fields, developed as a result of the wave motions and an inherent non-linearity in the material, are proportional to the square of the acoustic fields. Such non-linear effect occurs readily because of the high power density of surface waves. The basic requirement of non-linearity is such that the generated electric field E is proportional to $S^2$, the square of the strain S. (In addition, there is the usual electric field component E proportional to the strain S.) Consequently, the effect of the total strain may be represented:

$$(S_{tot})^2 \approx 1/2\ S_j^2 + 1/2\ S_l^2 \tag{17}$$

plus cross-product terms containing the sum and difference frequencies. The relevant cross-product terms containing difference frequencies are of the form:

$$S_j\ S_l \cos [2\omega_1 (x/V7 + (1/2T_d^2) (4xt/V)] . \tag{18}$$

It follows from equation (18) that the instantaneous temporal difference frequency $f_{dj}$ between the local oscillator and the $j^{th}$ sample depends on $x$ in the following way:

$$f_{dj} = 1/2\pi\ .\ (2x/T_d^2 V) . \tag{19}$$

With all output transducers tuned to a selected resonance frequency $f_r$ by means of the external electrical networks, it then follows that the transducer which will be principally excited is located at $x_j$ such that:

$$f_r = f_{dj} = (1/2\pi)\ (2x_j/T_d^2 V) , \tag{20}$$

and, hence,:

$$x_j = (2\pi f_r\ T_d^2 V)/2 . \tag{21}$$

In order for the transducer at $x_j$ to properly respond to the $j^{th}$ sample of duration $T_f$, it must have a bandwidth $\delta f = 1/T_f$. Assuming all transducers to be characterized by this bandwidth, then, in order to avoid interference, they must be spaced by a distance $\delta x$ such that:

$$\delta(f_{dj}) = (1/2\pi)\ (2\delta x/T_d^2V) = \delta f = 1/T_f\ . \quad 22$$

As seen before, $$1/\ T_f = 1/4\pi BT_d^2\ , \quad 23$$

and, hence, $$\delta x = (1/4B)\ V\ . \quad 24$$

It may now be shown that the next sample, i.e., the $j+1^{th}$, which is launched a time 1/2B later, will generate a difference frequency with the local oscillator given by:

$$f_{d(j+1)} = (1/2\pi)\ (2x + V/2B)/T_d^2V \quad 25$$

Consequently, this sample will generate a frequency $f_r$ at a position $x_{j+1}$, which is different by $\Delta x$ from the position at which the preceding sample generated a frequency $f_r$, such that $\Delta x$ is given by $$\Delta x = (1/4B)\ V\ . \quad 26$$

Upon comparing equations (26) and (24), it is seen that $\delta x = \Delta x$, i.e., the next sample will just generate the required frequency at the next transducer. As the transducer spacing was chosen such as to avoid interference, it follows that each sample will emerge from a specific transducer and from that transducer only. All emerging samples are characterized by a frequency $f_r$, determined by the resonant property of the networks connected to each transducer separately. In order to transform the frequency bursts at frequencies $f_r$ into DC pulses, diode 48 rectifies the bursts and the resultant video sample appears across load resistor 49. The end result is that the respective different video samples taken from across the different output load resistors 49 correspond to the respective different time-displaced portions of the intelligence-bearing or video information signals produced in this case by signal source 30.

Figure 9:
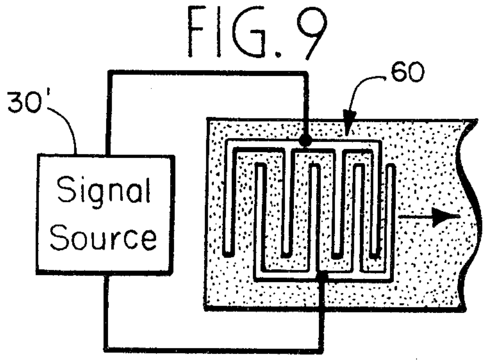
FIG. 9 is a diagram of an alternative for one portion of the system of FIG. 7.

Alternatively to the use of the system of FIG. 6 including dispersive line 33, the input transducers may themselves be of a dispersive-frequency nature so as directly to achieve the frequency coding. This is illustrated in FIG. 9 wherein signal source 30' is connected across an input transducer 60 composed of two combs of interleaved conductive teeth wherein the spacing between the adjacent pairs of teeth becomes progressively smaller from one direction to the other. It is known, as such, in the prior art that such a progressive change in inter-tooth spacing results in the array being frequency-dispersive.

For simplicity of derivation, it was assumed that the reference point $x=0$ was located in the center of substrate 42. In that case, the same frequency $f_r$ is generated equidistantly both to the left and right of $x=0$. Thus, it might seem more consistent to locate transducers 46 only at positions where $x>0$. In practice, however, the location of $x=0$ can be made to fall anywhere between input transducers 41 and 43 merely by appropriately timing the local oscillator pulse.

As indicated, the discussion has assumed the existence of a non-linear effect within the piezoelectric material, and that is the preferred mode of operation. In the absence of such a non-linearity in the material, essentially the same end result may be obtained by inserting a non-linear diode 62 between the electrode of each output transducer 46 and its associated inductor 50 as shown in FIG. 7*a*. Diode 62 performs the mixing function and generates the signal $f_r$ that then is rectified by diode 48.

To avoid the need for coils in the resonant networks, it is possible to take the difference frequency of $f_r=0$. In that case, and with a non-linear piezoelectric substrate, the external network need only include a load resistor by-passed for higher frequencies. Absent non-linearity in the substrate, a series diode again would be required to perform the mixing. However, this special case of $f_r=0$ may be disadvantageous because the first two terms of the strain product, as expressed in equation (17), result in the development of a direct-current bias. Nevertheless, by arranging that $S_l >> S_j$, the first term in that equation is small compared to $S_jS_l$ and the second term is constant over an entire line so that it may be compensated.

Whatever the ultimate particular manner of mixing or frequency disperson employed, the resulting solid-state device takes advantage of the frequency-domain mode of signal coding in order to distribute coded samples among a plurality of different output ports, each such port being represented by an individually different output transducer 46 and its associate output network. Consequently, the resulting device may take advantage of the minute sizes that have been possible in the fabrication of acoustic surface-wave devices, while at the same time taking advantage of the flexibility of signal handling that is characteristic of the frequency-domain mode of signal coding. Without more, the individual different video samples derived from output transducers 46 may be fed directly into a corresponding plurality of display elements which together form one line of a television image display. In more complete panels of the ordinary row and column matrix arrangement, those different video samples are fed respectively to each of the successive different columns of display elements. Of course, other apparatus may then be used to sequentially switch from one line to the next as different segments of the total image are developed.

While particularly discussed in connection with image display, it is apparent that the system of FIG. 7 may be employed in any application wherein it is necessary simultaneously to develop discrete output signals corresponding to a plurality of respective different portions of an input signal. Thus, for example, the system may find utility also in performing the function of a shift register from which an entire row of stored information is "dumped" simultaneously.

While particular embodiments of the present invention have been shown and described, it is apparent that changes and modifications may be made therein without departing from the invention in its broader aspects. The aim of the appended claims, therefore, is to cover all such changes and modifications as fall within the true spirit and scope of the invention.

I claim:

1. A signal distribution system comprising:

a substrate of piezoelectric material;

a source of time-domain intelligence-bearing signals;

first means including first input transducer means coupled to said source and responsive to said signals for launching in a predetermined direction on said substrate acoustic surface waves in the form of a train of intelligence-bearing time-displaced frequency ramp pulses representing time-displaced portions of said time-domain intelligence-bearing signal, said pulses having a like frequency excusion and having amplitudes representing intelligence on said signal;

second means including second input transducer means coupled to said medium for launching in said substrate in a direction effectively opposite to said predetermined direction acoustic surface waves in the form of a reference frequency ramp having the same time slope as the slope of said frequency ramp pulses;

and a plurality of output transducers disposed on said substrate and in spaced relationship between said first and second input transducers which are individually responsive to respective different spatially-distributed combinations of said reference frequency ramp and ramp pulses for yielding respective different output signals individually corresponding to respective different time-displaced portions of said time-domain intelligence-bearing signals.

2. A system as defined in claim 1 in which samples of the energy in said acoustic waves produced by said intelligence-bearing signals develop a first strain in said substrate expressed by $$S_j \cos [\omega_1 (t-x/v) + (1/2T_d^2) (t-x/v)^2],$$

and in which the energy in said acoustic waves produced by said siganls from said counterpart source develops a second strain in said substrate expressed by $S_l \cos [\omega_1 (t+x/v) + (1/2T_d^2) (t+x/v)^2]$, where $S_j$ is a constant proportional to the first strain, $\omega_1$ is the frequency of a carrier on which said intelligence-bearing signals are modulated, $t$ is time, $x$ is the distance from a reference position between the first-mentioned and the second-mentioned launching means, $V$ is the velocity of said waves in said substrate, $T_d$ is the coefficient of dispersive time delay of the frequency components in said waves and $S_l$ is a constant proportional to the second strain.

3. A system as defined in claim 1 wherein said first means includes means responsive to time-domain intelligence-bearing signals for developing corresponding frequency-domain signals to which said first input transducers responds.

4. A system as defined in claim 1 in which one of said input transducers responds to input signals of a time domain character for developing spatially-distributed frequency-domain signals.

5. A system as defined in claim 1 in which said output transducers respond to piezoelectric fields proportional to the square of the strain produced by said acoustic waves.

6. A system as defined in claim 2 in which the difference $\delta x$ in spacing between said output tranducer satisfies the relationship:

$$\delta x = (1/4B) V,$$

where B is the bandwidth of said intelligence-bearing signals.

7. A system as defined in claim 1 wherein said substrate exhibits a non-linear relationship between strain in the substrate and electric fields developed by said surface waves.

8. A system as defined in claim 1 wherein said output transducers each are coupled to a non-linear element that effects mixing of energy in the acoustic surface waves launched by said first and second surface waves.

9. A system as defined in claim 1 in which each of said output transducers is coupled to means for demodulating the intelligence in said signals from the energy in said combinations.

* * * * *